United States Patent Office 3,303,409
Patented Feb. 7, 1967

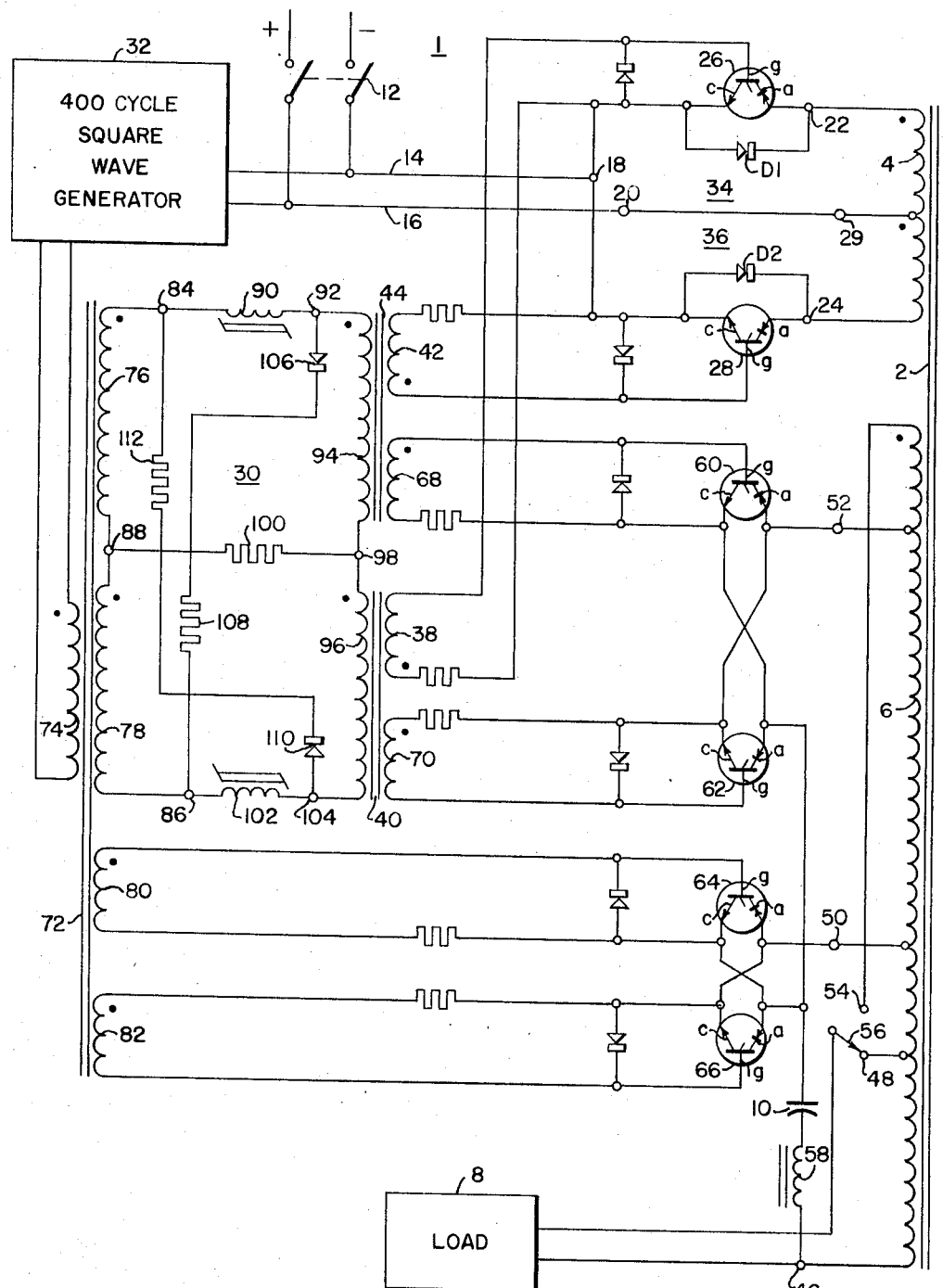

3,303,409
CURRENT INTERRUPTING NETWORK FOR CONTROLLED RECTIFIERS
Theodore M. Heinrich, Auglaize Township, Allen County, and Andress Kernick, Lima, Ohio, assignors to Westinghouse Electric Corporation, Pittsburgh, Pa., a corporation of Pennsylvania
Filed Jan. 25, 1963, Ser. No. 253,808
13 Claims. (Cl. 321—45)

This invention relates generally to switching devices and more particularly to an inverter embodying discontinuous control type valves.

Inverting apparatus of the large power capacity generally use controlled rectifiers for switching devices. Since these devices control the flow of direct current, means must be provided for interrupting this flow of current for a sufficient time interval to permit the controlled rectifiers to assume their non-conducting or open switch state.

It is an object of this invention to provide a new and simple arrangement for interrupting the current flow through the controlled rectifier for a sufficient period of time to permit it to reach its non-conducting state.

Another object of this invention is to interrupt the flow of current through such a controlled rectifying device by a capacitor which is charged to a relatively high voltage.

Another object of this invention is to provide a system for charging the interrupting capacitor through a transformer at a first value as determined by a plural number of transformer windings and then to discharge this capacitor through a lesser number of transformer windings to increase the shut off effect.

A still further object of the invention is to provide apparatus for charging the capacitor through an inductance and an asymmetric current conducting device whereby the capacitor is charged to a voltage greatly in excess of the charging voltage.

Other objects will be apparent from the specification, the appended claims and the drawings, the single figure of which illustrates schematically an inverter embodying the invention.

Referring to the drawings by character of reference the numeral 1 designates generally an inverter having an output transformer 2 provided with a center-tapped primary winding 4 and a secondary winding 6 connected to energize a load 8 and a commutating capacitor 10. Direct-current energy is fed to the inverter 1 from a suitable source of supply through a disconnect switch 12 and conductors 14 and 16 to the input terminals 18 and 20.

The input terminal 18 is connected to the end terminals 22 and 24 of the primary winding 4 through silicon controlled rectifying devices 26 and 28 respectively. Diodes D1 and D2 are individually connected in anti-parallel with the devices 26 and 28, respectively. The other input terminal 20 is directly connected to the center tap 29 of the primary winding 4. Conduction of the device 26 is initiated by means of a conducting pulse applied between the gate g and cathode c from a secondary winding 38 of a transformer 40 of the pulse generator 30 through an obvious circuit. Similarly, conduction of the device 28 is initiated by means of a signal transmitted to its gate g and cathode c from a secondary winding 42 of a transformer 44 of the pulse generator 30 through an obvious circuit.

In order to provide means for rendering the devices 26 and 28 non-conductive, the secondary winding 6 of the transformer 2 is provided with terminals 46, 48, 50, 52 and 54. One terminal of the commutating capacitor 10 is connected through an inductance 58 to the transformer terminal 46. The other terminal of the capacitor 10 is connected through a first pair of back-to-back or anti-parallel connected silicon controlled rectifying devices 60 and 62 to the terminal 52 and through a second pair of back-to-back silicon controlled devices 64 and 66 to the terminal 50. The devices 60, 62, 64 and 66 are preferably of the same type as the devices 26 and 28 but may be of different current and voltage ratings.

To initiate conduction of the valves 60 and 62 transformers 44 and 40 are respectively provided with second secondary windings 68 and 70 which are respectively connected between the gate g and the cathode c of the devices 60 and 62. The devices 60 and 62 permit charging current to flow through the inductance 58 between the terminals 52 and 46 to charge the capacitor 10 to opposite polarities. The resonant frequency of the capacitor 10 and inductance 58 is in the order of 10 to 15 kilocycles and provides for a slight overshoot of the voltage applied to the capacitor 10 so that the maximum energy is supplied therein.

The pulse generator 30 is controlled by a square wave signal, which in a typical case could have a frequency of 400 cycles per second, supplied to the primary winding 74 of its input transformer through an obvious circuit. The transformer 72 has a plurality of secondary windings 76, 78, 80 and 82. The windings 80 and 82 are connected between the gate g and cathode c of the devices 64 and 66 respectively whereby these devices 64 and 66 are rendered conducting with little if any delay subsequent to the change in polarity of the output signal of the generator 32. The windings 76 and 78 are connected through time delay networks to energize the output transformer 40 and 44. The windings 76 and 78 are series connected to provide free end terminals 84 and 86 and a common terminal 88. The upper free end terminal 84 is connected through a saturating core reactor 90 to the upper end terminal 92 of the primary winding 94 of the transformer 44. The lower end terminal of the winding 94 and the upper end terminal of the primary winding 96 of the transformer 40 are connected together to form a common tap 98. A resistor 100 connects this tap 98 to the common terminal 88. The lower free end terminal 86 is connected through a saturating core reactor 102 to the lower end terminal 104 of the winding 96.

Prior to saturation of the reactors 90 and 102 the only current flowing therethrough is the magnetizing current. While the magnitude of this current is small, it is desirable to prevent this current from flowing through the primary windings 94 and 96. For this purpose, the terminal 92 is connected through a diode 106 and a resistor 108 to the free end terminal 86 and the lower end terminal 104 is connected through a diode 110 and resistor 112 to the free end terminal 84.

It is believed that the remainder of the description may best be set forth by a description of operation which is as follows: Upon closure of the disconnect switch 12 the conductors 14 and 16 are energized with unidirectional potential whereby the conductor 16 is maintained positive with respect to the conductor 14. Since these conductors are connected to the 400 cycle generator 32, their energization initiates operation of this generator and square wave voltage is applied to the primary winding 74 of the transformer 72, whereby square wave voltages are induced in the secondary windings 76, 78, 80 and 82.

Assuming a half cycle in which the dotted end of the winding 74 is positive, the dotted end of the secondary windings 76, 78, 80 and 82 will also be positive. This polarity of the winding 82 is ineffective to operate the device 66 however, the winding 80 is of the proper polarity to render the device 64 conducting. Conduction of the device 64 discharges the capacitor 10 through the portion of the secondary winding 6 between the terminals 50 and 46. Energization of the windings 76 and 78 is without immediate effect on the energization of the transformers 40 and 44 however it does initiate the timing out of the saturable reactors 90 and 102.

At the end of a predetermined time interval, which may for example be of about 50 microseconds, the reactors 90 and 102 will saturate whereby full voltage from the windings 76 and 78 will appear across the windings 94 and 96 energizing the transformers 40 and 44 to make the dotted ends of the windings positive with respect to the undotted ends. The polarity of the energization of the windings 38 and 70 is incorrect to initiate conduction of the devices 26 and 62; however, the voltage produced in the windings 42 and 68 render the associated devices 28 and 60 conducting by transmitting firing pulses of current between their gates and cathodes. The device 28 then establishes current flow through a current path 36 extending from terminal 18 through the device 28 and the lower half of the winding 4 to the input terminal 20 to energize the windings 4 and 6 such that their dotted ends are positive with respect to their undotted ends.

As the flux builds up in the core of the transformer 2, current flows between the terminals 46 and 52 to charge the capacitor 10 with its upper plate positive with respect to its lower plate. At the end of a predetermined timing period the capacitor 10 will become charged and the current through the device 60 will go below the maintaining current of the device and the device 60 will become nonconducting. Current will also flow through the load 8 between the terminals 46 and 48 or 46 and 54 depending upon the positions of the switch arm 56.

Current will continue to flow through the path 36 and the device 28 will remain conducting until such time as the voltage applied from the 400 cycle square wave generator 32 to the primary winding 74 reverses. When this occurs, the output potential of the windings 76, 78, 80 and 82 will immediately reverse. Reversal of the output polarity of the windings 76 and 78 starts timing out this time delay between energization of the transformer 72 and the transformers 40 and 44. The reversal of the voltage in the winding 80 is without effect upon the device 64 because of its polarity. The votlage output of the winding 82, however, renders the device 66 conducting which thereupon connects the upper terminal of the capacitor 10 through the anode and cathode circuit of the device 66 to the winding terminal 50 whereby the capacitor 10 discharges through the portion of the winding 6 intermediate the terminals 50 and 46. The discharge of the capacitor 10 through this portion of the winding raises the voltage on the transformer so that the diode D2 becomes forwardly biased. This in effect, places a reverse voltage across the device 28 which reduces and reverses the current flow therethrough and the device 28 becomes non-conducting. This reversal of voltage caused by the discharge of the capacitor 10 is of sufficient duration to insure that the device 28 will not recondust when forward potential is again applied between its anode and cathode.

At the end of the delay time, the reactors 90 and 102 saturate and energizing current for the transformers 40 and 44 will flow from the free end terminal 86 through the reactor 102, the windings 96 and 94, and reactor 90 to the terminal 84. This reverses the voltage output of the transformers 40 and 44. The reversal of the voltage output of the transformer 44 is without immediate effect because the polarity output of the windings 42 and 68 is not such as to render the devices 28 and 60 conductive. The output potential from the windings 38 and 70 is however effective to render the devices 26 and 62 conducting. Rendering of the device 26 conducting closes a path 34 which extends from the terminal 20 through the upper half of the winding 4, anode to cathode in the device 26 back to the input terminal 18.

Current flow through this path 34 causes voltage to be induced in the core of transformer 2 in a direction to render the terminal 46 of the winding 6 positive with respect to the terminals 48 and 54 whereby current is supplied to the load 8 in the opposite direction as when the path 36 was conducting and charging current is supplied through the inductance 58 to charge the capacitor 10 through the now conducting device 62 to render the lower plate thereof positive with respect to the upper plate. As stated above, the charging current soon becomes lower than the sustaining current of the device 62 and the device 62 becomes non-conducting. Due to the inductive effect of the inductance 58 and the fact that the devices 60 and 62 are one-way devices, the voltage to which the capacitor 10 is charged is somewhat greater than the voltage which appears between the terminals 52 and 46.

The path 34 continues to conduct until such time that the output of the generator 32 reverses to reverse the polarity of the transformer 72 at which time the winding 80 renders the device 64 conducting to discharge the capacitor 10 through the turns of the winding 6 between the terminals 46 and 50. As before, this reverses the polarity of the potential across the device 26 causing this device to become non-conducting. The discharge time of the capacitor is sufficient to hold the device 26 non-conducting until such time as it will withstand the re-application of forward voltage. A typical time interval for saturations of the reactors 90 and 102 would be 50 microseconds. When the reactors 90 and 120 again saturate, the transformers 40 and 44 will become energized in a polarity at which the dotted ends of their windings become positive with respect to their undotted ends whereby the devices 28 and 60 will be rendered conducting with the results as stated above. The inverter 1 will supply alternating potential to the load 8, as described, until such time that its operation is interrupted by opening of the disconnect switch 12.

Although the invention has been described with reference to a certain specific embodiment thereof, numerous modifications are possible and it is desired to cover all modifications within the spirit and scope of the invention.

What is claimed and is desired to be secured by United States Letters Patent is as follows:

1. An inverter comprising a pair of power input terminals, a pair of power output terminals, first and second discontinuous control type electric valves, a first electrical path interconnecting said pairs of terminals for energizing said output terminals in a first polarity and including said first valve, a second electric path interconnecting said pairs of terminals for energizing said output terminals in a second polarity and including said second valve, a transformer having winding means, means connecting a part of said winding means to be energized as a consequence of current flow through said paths, an energy storage device, switch means, means including said switch means connecting said energy storage means to said winding means, and a sequencing circuit, said sequencing circuit including means providing a sequence of output signals, means connecting said sequencing circuit to said switch means and to said electric valves, sequential ones of said output signals being operable to render said switch means conductive to connect said storage device to said winding means to discharge said storage device, to render said first valve conducting, to render said switch means conductive to connect said storage device to said winding means to charge said storage device, to render said switch means conductive to connect said storage device to said winding means to discharge said storage device, to render said second valve conducting, and to render said switch means conductive to connect said storage device to said winding means to charge said storage device.

2. An inverter comprising a pair of power input terminals, a pair of power output terminals, first and second discontinuous control type electric valves, a first electrical path interconnecting said pairs of terminals for energizing said output terminals in a first polarity and including said first valve, a second electric path interconnecting said pairs of terminals for energizing said output terminals in a second polarity and including said second valve, a transformer having winding means comprising turns about a magnetic core, means connecting a part of said winding means to be energized as a consequence of current flow through said paths, an energy storage device, switch means, means including said switch means connecting said energy storage means to first and second portions of said winding means, and a sequencing circuit, said sequencing circuit including means providing a sequence of output signals, means connecting said sequencing circuit to said switch means and to said electric valves, sequential ones of said output signals being operable to render said switch means conductive to connect said storage device to said first portions of said winding means to discharge said storage device, to render said first valve conducting, to render said switch means conductive to connect said storage device to said second portion of said winding means to charge said storage device, to render said switch means conductive to connect said storage device to said first portion of said winding means to discharge said storage device, to render said second valve conducting, and to render said switch means conductive to connect said storage device to said second portion of said winding means to charge said storage device, said second portion including a greater number of said turns than said first portion.

3. An inverter comprising a pair of power input terminals, a pair of power output terminals, first and second discontinuous control type electric valves, a first electrical path interconnecting said pairs of terminals for energizing said output terminals in a first polarity and including said first valve, a second electric path interconnecting said pairs of terminals for energizing said output terminals in a second polarity and including said second valve, a transformer having winding means, means connecting a part of said winding means to be energized as a consequence of current flow through said paths, an energy storage device series connected with an inductance, switch means having first and second asymmetric conducting portions, means including said first and second portions of switch means connecting said energy storage means to said winding means, and a sequencing circuit, said sequencing circuit including means providing a sequence of output signals, means connecting said sequencing circuit to said switch means and to said electric valves, sequential ones of said output signals being operable to render said first portion of said switch means conductive to connect said storage device to said winding means to discharge said storage device, to render said first valve conducting, to render said second portion of said switch means conductive to connect said storage device to said winding means to charge said storage device, to render said first portion of said switch means conductive to connect said storage device to said winding means to discharge said storage device, to render said second valve conducting, and to render said second portion of said switch means conductive to connect said storage device to said winding means to charge said storage device.

4. In a switching device, input terminals, output terminals, a discontinuous type electric valve, a current path interconnecting said input and output terminals for current flow therebetween and including said valve, a transformer having a magnetic core and winding turns magnetically coupled to said core, means coupling a portion of said turns for energization by current flowing through said path, an energy storage device, means including a first asymmetric current flow controlling apparatus connecting said storage device across a first number of said turns, means including a second asymmetric current flow controlling apparatus connecting said storage device across a second number of said turns, said second number being greater than said first number, and means for rendering said valve and said second asymmetric apparatus conductive and thereafter rendering said first asymmetric apparatus conductive.

5. In a switching device, input terminals, output terminals, a discontinuous type electric valve, a current path interconnecting said input and output terminals for current flow therebetween and including said valve, a transformer having a magnetic core and winding turns magnetically coupled to said core, means coupling a portion of said turns for energization by current flowing through said path, a series circuit comprising a capacitor series connected with an inductor, means including a first asymmetric current flow controlling apparatus connecting said series circuit across a first number of said turns, means including a second asymmetric current flow controlling apparatus connecting said series circuit across a second number of said turns, said second number being greater than said first number, and means for rendering said valve and said second asymmetric apparatus conductive and thereafter rendering said first asymmetric apparatus conductive.

6. In an inverter, a pair of input terminals adapted to be connected to a source of unidirectional potential, a pair of output terminals, first and second discontinuous control type semiconductor devices, a transformer, a first current path interconnecting said pairs of terminals and including said first device and said transformer, a second current path interconnecting said pairs of terminals and including said second device and said transformer, a capacitor, valve means, means including said valve means connecting said capacitor to said transformer, a source of alternating control potential, time delay means, first means connecting said source of control potential to said devices and said valve means for rendering said devices alternately conductive and said valve means conductive to charge said capacitor as a function of the alternations of said control potential, said first means including said delay means, and second means connecting said source of control potential to said valve means for rendering said valve means conductive to discharge said capacitor as a function of the alternations of said control potential, said second means acting to actuate said valve means with a lesser time delay than the delay afforded by said delay means.

7. In an inverter, a pair of input terminals adapted to be connected to a source of unidirectional potential, a pair of output terminals, first and second discontinuous control type semiconductor devices, a transformer, a first current path interconnecting said pairs of terminals and including said first device and said transformer, a second current path interconnecting said pairs of terminals and including said second device and said transformer, a series circuit comprising an inductor serially connected with a capacitor, valve means, means including said valve means connecting said series circuit to said transformer, a source of alternating control potential, time delay means, first means connecting said source of control potential to said devices and said valve means for rendering said devices alternately conductive and said valve means conductive to charge said capacitor as a function of the alternations of said control potential, said first means including said delay means, and second means connecting said source of control potential to said valve means for rendering said valve means conductive to discharge said capacitor as a function of the alternations of said control potential, said second means acting to actuate said valve means with a lesser time delay than the delay afforded by said delay means.

8. An inverter of the character described comprising, a pair of power input terminals, a transformer having winding means and a core, a plurality of discontinuous control type valves, each said valve having a power circuit and a control circuit operable to control the initiation of current through said power circuit, a first power path connecting said input terminals to said winding means and including said power circuit of a first of said valves, a second power path connecting said input terminals to said winding means and including said power circuit of a second of said valves, said winding means being arranged relative to said power paths so as to develop flux in said core in opposite directions in response to alternate conductions of said power paths, a pulse supplying network providing a sequence of output signals, means connecting said pulse supplying network to said control circuits whereby said output signals are operable to render said power circuits of said first and second valves conductive in alternating sequence, first and second pairs of said valve devices, an energy storage device, means connecting said storage device across a first predetermined number of turns of said winding means and including said first pair of said valve devices, means connecting said storage device across a second predetermined number of turns of said winding means and including said second pair of said valve devices, said first number being a different number than said second number, and means connecting said pulse supplying network to said valve devices whereby at least one of said valve devices of said first pair is rendered conductive subsequent to the initiation of conduction of said first and second valves and at least one of said valve devices of said second pair is rendered conductive after the rendering of at least one of said valve devices of said first pair conductive and prior to the next subsequent rendering of said first and second valves conductive.

9. An inverter of the character described comprising, a pair of power input terminals, a transformer having winding means and a core, a plurality of discontinuous control type valves, each said valve having a power circuit and a control circuit operable to control the initiation of current through said power circuit, a first power path connecting said input terminals to said winding means and including said power circuit of a first of said valves, a second power path connecting said input terminals to said winding means and including said power circuit of a second of said valves, said winding means being arranged relative to said power paths so as to develop flux in said core in opposite directions in response to alternate conductions of said power paths, a pulse transmitting network connected to said control circuits and operable to render said power circuits of said first and second valves conductive in alternating sequence, first and second pairs of said valve devices, an energy storage device, means connecting said storage device across a first predetermined number of turns of said winding means and including said first pair of said valve devices, means connecting said storage device across a second predetermined number of turns of said winding means and including said second pair of said valve devices, said first predetermined number being a greater number greater than said second predetermined number, and means connecting said pulse supplying network to said valve devices whereby at least one of said valve devices of said first pair is rendered conductive subsequent to the initiation of conduction of said first and second valves and at least one of said valve devices of said second pair is rendered conductive after the rendering of at least one of said valve devices of said first pair conductive and prior to the next subsequent rendering of said first and second valves conductive.

10. An inverter of the character described comprising, a pair of power input terminals, a transformer having winding means and a core, a plurality of discontinuous control type valves, each said valve having a power circuit and a control circuit operable to control the initiation of current through said power circuit, a first power path connecting said input terminals to said winding means and including said power circuit of a first of said valves, a second power path connecting said input terminals to said winding means and including said power circuit of a second of said valves, said winding means being arranged relative to said power paths so as to develop flux in said core in opposite directions in response to alternate conductions of said power paths, a pulse transmitting network connected to said control circuits and operable to render said power circuits of said first and second valves conductive in alternating sequence, first and second pairs of said valve devices, a capacitor, an inductance, means connecting said capacitor and said inductance in series across a first predetermined number of turns of said winding means and including said first pair of said valve devices, means connecting said capacitor and said inductance in series across a second predetermined number of turns of said winding means and including said second pair of said valve devices, said first predetermined number being a greater number greater than said second predetermined number, and means connecting said pulse supplying network to said valve devices whereby at least one of said valve devices of said first pair is rendered conductive subsequent to the initiation of conduction of said first and second valves and at least one of said valve devices of said second pair is rendered conductive after the rendering of at least one of said valve devices of said first pair conductive and prior to the next subsequent rendering of said first and second valves conductive.

11. An inverter of the character described comprising, a pair of power input terminals, a transformer having winding means and a core, a plurality of discontinuous control type valves, each said valve having a power circuit and a control circuit operable to control the initiation of current through said power circuit, a first power path connecting said input terminals to said winding means and including said power circuit of a first of said valves, a second power path connecting said input terminals to said winding means and including said power circuit of a second of said valves, said winding means being arranged relative to said power paths so as to develop flux in said core in opposite directions in response to alternate conductions of said power paths, a second transformer having a core with a plurality of winding turns, a third and a fourth transformer each having a primary winding and a pair of secondary windings, an impedance, first and second saturating reactors, means connecting a number of said turns across said primary winding of said third transformer and including said impedance and said first reactor, means connecting a number of said turns across said primary winding of said fourth transformer and including said impedance and said second reactor, means connecting a first of said secondary windings of said third transformer across said control circuit of said first valve, means connecting a first of said secondary windings of said fourth transformer across said control circuit of said second valve, means energizing some of said turns with alternating potential power, first and second pairs of said valve devices, each said valve device having a power circuit and a control circuit, means connecting the second of said secondary windings of said third transformer across said control circuit of a first valve device of said first pair of said devices, means connecting the second of said secondary windings of said fourth transformer across said control circuit of the second valve device of said first pair of said devices, a capacitor, an inductance, means connecting said capacitor and said inductance in series across a first predetermined number of turns of said winding means and including said first pair of said valve devices, said valve devices of each of said pairs of devices being connected in anti-parallel, means connecting said capacitor and said inductance in series across a second predetermined number of turns of said winding means and including said second pair of said valve devices, said first predetermined number being a greater number greater than said second predetermined number, means connecting a number of said turns of said second transformer across a first of said valve devices of said second pair of said devices, and means connecting a number of said turns of said second transformer across a second of said valve devices of said second pair of said devices.

12. An inverter of the character described comprising, a pair of power input terminals, a transformer having winding means and a core, a plurality of discontinuous control type valves, each said valve having a power circuit and a control circuit operable to control the initiation of current through said power circuit, a first power path connecting said input terminals to said winding means and including said power circuit of a first of said valves, a second power path connecting said input terminals to said winding means and including said power circuit of a second of said valves, said winding means being arranged relative to said power paths so as to develop flux in said core in opposite directions in response to alternate conductions of said power paths, a second transformer having a core with a primary winding and a plurality of secondary windings, one of said secondary windings of said second transformer having end taps and an intermediate tap, a third and a fourth transformer each having a primary winding and a pair of secondary windings, a plurality of impedances, first and second saturating reactors, means connecting said primary windings of said third and fourth transformers in series to provide a pair of free end terminals and a common terminal, means connecting one of said free terminals to one of said end taps and including said first reactor, means connecting the other of said free terminals to the other of said end taps and including said second reactor, means connecting said common terminal to said intermediate tap and including a first of said impedances, first and second diodes, means connecting said one free terminal to said other end tap and including said first diode and a second of said impedances, means connecting said other free terminal to said one end tap and including said second diode and a third of said impedances, means connecting a first of said secondary windings of said third transformer across said control circuit of said first valve, means connecting a first of said secondary windings of said fourth transformer across said control circuit of said second valve, means energizing said primary winding of said second transformer with alternating potential power, first and second pairs of said valve devices, each said valve device having a power circuit and a control circuit, means connecting the second of said secondary windings of said third transformer across said control circuit of a first valve device of said first pair of said devices, means connecting the second of said secondary windings of said fourth transformer across said control circuit of the second valve device of said first pair of said devices, a capacitor, an inductance, means connecting said capacitor and said inductance in series across a first predetermined number of turns of said winding means and including said first pair of said valve devices, said valve devices of each of said pairs of devices being connected in anti-parallel, means connecting said capacitor and said inductance in series across a second predetermined number of turns of said winding means and including said second pair of said valve devices, said first predetermined number being a greater number greater than said second predetermined number, means connecting a number of said turns of said second transformer across a first of said valve devices of said second pair of said devices, and means connecting a number of said turns of said second transformer across a second of said valve devices of said second pair of said devices.

13. In a pulse generator, first and second and third transformers, each said transformer having a winding, said winding of said first transformer having end taps and an intermediate tap, first and second saturating reactors, a plurality of impedances, means connecting said windings of said second and third transformers in series to provide a pair of free end terminals and a common terminal, means connecting one of said free end terminals to one of said end taps and including said first reactor, means connecting the other of said free end terminals to the other of said end taps and including said second reactor, means connecting said common terminal to said intermediate terminal and including a first of said impedances, first and second diodes, means connecting said one free end terminal to said other end tap and including said first diode and a second of said impedances, and means connecting said other free end terminal to said one end tap and including said second diode and a third of said impedance.

References Cited by the Examiner
UNITED STATES PATENTS

| | | | |
|---|---|---|---|
| 2,809,303 | 10/1957 | Collins | 307—106 X |
| 2,824,976 | 2/1958 | Weinberg et al. | 307—106 X |
| 3,038,089 | 6/1962 | Kittrell et al. | 307—33 X |
| 3,050,672 | 8/1962 | Alexanderson. | |
| 3,085,190 | 4/1963 | Kearns et al. | 321—47 |
| 3,118,105 | 1/1964 | Relation et al. | 321—45 |
| 3,161,837 | 12/1964 | Lloyd | 331—113 |
| 3,213,351 | 10/1965 | Walker | 321—47 X |

JOHN F. COUCH, *Primary Examiner.*

W. SHOOP, *Assistant Examiner.*